(12) United States Patent
Kittelmann et al.

(10) Patent No.: US 6,587,483 B2
(45) Date of Patent: Jul. 1, 2003

(54) Q-SWITCHED SOLID STATE LASER WITH ADJUSTABLE PULSE LENGTH

(75) Inventors: Olaf Kittelmann, Jena (DE); Frank Strauch, St. Augustin (DE)

(73) Assignee: Carl Zeiss Jena GmbH, Jena (DE)

( * ) Notice: Subject to any disclaimer, the term of this patent is extended or adjusted under 35 U.S.C. 154(b) by 132 days.

(21) Appl. No.: 09/729,563

(22) Filed: Dec. 4, 2000

(65) Prior Publication Data

US 2001/0021205 A1 Sep. 13, 2001

(30) Foreign Application Priority Data

Dec. 4, 1999 (DE) .......................... 199 58 566

(51) Int. Cl.[7] .................................. H01S 3/11
(52) U.S. Cl. .................. 372/13; 372/12; 372/22; 372/26; 372/28
(58) Field of Search .................. 372/13, 12, 10, 372/22, 69, 25, 26, 28

(56) References Cited

U.S. PATENT DOCUMENTS

| | | | | |
|---|---|---|---|---|
| 4,412,330 A | * | 10/1983 | Eckes et al. .................. 372/13 |
| 4,701,929 A | * | 10/1987 | Baer et al. .................... 372/27 |
| 5,121,245 A | * | 6/1992 | Johnson ....................... 372/27 |
| 5,157,677 A | * | 10/1992 | Narhi et al. ................... 372/13 |
| 5,197,074 A | * | 3/1993 | Emmons, Jr. et al. ......... 372/13 |
| 5,621,745 A | * | 4/1997 | Yessik et al. ................. 372/26 |
| 5,748,655 A | * | 5/1998 | Yessik et al. ................. 372/13 |
| 5,832,013 A | * | 11/1998 | Yessik et al. ................. 372/26 |
| 6,009,110 A | * | 12/1999 | Wiechmann et al. ......... 372/25 |
| 2001/0021205 A1 | * | 9/2001 | Kittelmann et al. .......... 372/13 |

* cited by examiner

Primary Examiner—Leon Scott, Jr.
(74) Attorney, Agent, or Firm—Reed Smith LLP

(57) ABSTRACT

A Q-switched solid state laser is disclosed comprising a pump radiation source, whose pump radiation is focused through focusing elements in the laser crystal, a resonator formed by reflecting surfaces in which at least one laser crystal, an acousto-optic switch for Q-switching, and, if desired, a freqency-doubling crystal (KTP) are arranged. The acousto-optic Q-switch is connected with an electronic unit generating a high-frequency wave which can be modulated. The Q-switch is controlled by the high-frequency wave in such a way that laser pulses with pulse lengths on the order of magnitude of several microseconds ($\mu s$) and with an energy content on the order of magnitude of several millijoules can be generated by controlling the steepness of the edge of the modulation function of the high-frequency wave.

13 Claims, 1 Drawing Sheet

Q-SWITCHED SOLID STATE LASER WITH ADJUSTABLE PULSE LENGTH

BACKGROUND OF THE INVENTION a) Field of the Invention

The invention is directed to a Q-switched solid state laser with adjustable pulse length, particularly with a pulse length up to several microseconds and an energy content up to several millijoules, and is generally intended for material processing and specifically for treating biological tissue, for example, for ophthalmologic applications.

b) Description of the Relevant Art

The aim of ophthalmologic laser treatment is, among others, the thermal destruction of diseased tissue (coagulation). However, in so doing, healthy surrounding tissue is usually also affected or destroyed by the thermal action at the same time. Accordingly, there is a need to limit the heating spatially to a central treatment area with diseased tissue in order to protect the healthy tissue as far as possible; this can be accomplished with laser pulses of determined pulse length, pulse energy and repetition rates.

DE 39 36 716, for example, discloses a device for influencing material by pulsed laser radiation and describes the advantage of pulsed laser treatment compared with continuous-wave treatment of biological tissue. In this case, a temporal and spatial switching device of the light source is provided for repeated irradiation with light pulses for deliberately influencing material changes on the direct light-absorbing structures of the irradiated material and their immediate surroundings in a spatially limited manner.

Patent DE 44 01 917 C2 (Brinkmann) and references contained therein describe laser arrangements providing pulsed light with pulse lengths of several microseconds. However, the cost is quite high. For one, the pulses are generated by electro-optic Q-switching, which requires handling high voltages in the kV range (Pockels cell). On the other hand, a very fast feedback loop is used which adjusts the loss control during formation of the laser pulse by means of the Q-switch. A portion of the laser output is converted into an electric signal and is used for feedback. This allows lengthening of the laser pulses to the microsecond range.

Pulse generation by means of a saturable absorber would also be conceivable, but would additionally require the pulse lengthening unit comprising Pockels cell and feedback too. Together with the necessary output electronics for the feedback, this construction requires extensive space and, due to the water cooling among other reasons, is difficult to transport.

A compact Q-switched diode-pumped solid state laser with acousto-optic Q-switching is described in Patent Application No. 199 27 918.7, not yet published, in which exacting requirements are imposed on the quality of the dielectric layers of resonator components, since there is high radiation loading in the laser crystals with pulsed laser radiation. The arrangement described in this reference uses an acousto-optic Q-switch which can be installed in compact devices because of its small dimensions. Loss control in acousto-optic Q-switching is carried out by an ultrasonic wave which is generated in a crystal and which acts upon the laser beam traveling across it as a grating which diffracts part of the laser intensity circulating in the resonator. The pulse lengthening is carried out in this case solely through the presence of a frequency doubler which functions at the same time as a pulse output-coupler. It is disadvantageous that the pulse lengthening is no longer adequate in the range of high pulse energies required for the treatment of biological tissue because the inversion in the laser medium decreases faster as pulse energy circulating in the resonator increases.

YAG crystals are preferably used as active media, although other laser crystals are also possible. Lasers of this type are known to be robust in the sense that they retain their characteristics over a long period, even under environmental influences such as changes in temperature or jolting caused by transport. The laser emission wavelength lies in the near infrared range and is not usable for ophthalmologic laser coagulation treatment. However, efficient conversion of the wavelength of the radiated laser light into the visible spectral region with a frequency-doubling crystal within the resonator makes it possible to generate laser pulses that are suitable for such treatment.

OBJECT AND SUMMARY OF THE INVENTION

It is the primary object of the invention to provide a Q-switched solid state laser with adjustable pulse length by which the disadvantages of the prior art are extensively eliminated and in which an adjustment of the pulse length in the $\mu$s range is achieved economically with small volume and with great dependability and high stability.

According to the invention, this object is met in a Q-switched solid state laser comprising a laser crystal, focusing elements, a pump radiation source whose pump radiation is focused by focusing elements into the laser crystal, a resonator formed by reflecting surfaces in which at least one laser crystal, an acousto-optic switch for Q-switching and, if desired, a frequency doubling crystawherein a (KTP) are arranged. The acousto-optic Q-switch is connected with an electronic unit generating a high frequency wave which can be modulated. The Q-switch is controlled by the high-frequency wave in such a way that laser pulses with pulse lengths of one or more microseconds can be generated by controlling the steepness of the edge of the modulation function of the high frequency wave providing laser pulses with suitable parameters. Further constructions and details of the invention are described in the subsequent subclaims.

It is advantageous when means are provided for focusing the laser radiation in the frequency-doubling crystal in the resonator, wherein a switching edge of the modulation signals with a low slope is used for the Q-switch to prevent radiation damage to the frequency-doubling crystal.

It is further advantageous when a radiation attenuator is provided outside of the resonator for adjusting the energy of the emitted laser pulses.

In an advantageous construction of the invention, the adjustment of the energy of the laser pulses is achieved by means of controlling the intensity of the pump light source while adjusting the pulse length of the therapy (laser) radiation by controlling the edge steepness of the modulation of the high-frequency (HF) wave at the Q-switch.

It is advantageous to use as a monitor for the pulse energy the fluorescent light, which is emitted by the laser crystal shortly before the triggering of the laser pulse by converting it, e.g., by photoelectric elements, into electric signals that can be processed.

The solid state laser is also characterized, among other things, by the fact that the pump radiation source operates continuously or, as the case may be, also in pulsed regime in order to control, regulate or monitor thermal effects in the laser crystal. It may be advantageous to operate the pump radiation source in pulsed manner in order to prevent thermal effects in the laser crystal.

In ophthalmologic devices, it is advantageous when a quartz fiber which conducts light radiation and has a diameter of the order of 50 µm is provided between the solid state laser and an applicator receiving the laser radiation, where the coupling efficiency of the radiation transmitted through the fiber is about 80%.

The invention extensively overcomes particularly the disadvantages particularly of the solid state laser described in DE Patent Application No. 199 27 918.7 since a further degree of freedom for realizing an adjustable pulse length of the laser radiation in a solid state laser is introduced by the variability of the modulation of the Q-switch edge. This additional degree of freedom makes it possible to provide lengthened laser pulses in the µs range with extremely short resonators, two tendencies which would otherwise conflict. Accordingly, a µs laser is realized which has a resonator length of the order of 10 cm, which, for example, also enables manufacture of a compact, stable laser.

The methods for generating and lengthening laser pulses stated (claimed) in the present Application work either with or without a frequency-doubling crystal. The amplitude of the ultrasonic wave of the acousto-optic Q-switching also determines the level of losses. It is possible to deliberately control laser losses by modulating this amplitude. The pulse lengthening is determined by the modulation function of the Q-switch driving HF-wave which is generated. The steepness of the leading switching edge of the modulation function determines the length of the emitted laser pulses. Accordingly, very stable laser pulses have been generated by the device presented herein, wherein the pulse width and pulse height of several thousand repeated laser pulses varied by no more than 10%. Fast fluctuations in pulse shape, e.g., formation of output peaks within a pulse, were not observed. Accordingly, this device makes do without a feedback loop for stabilizing the pulses.

The invention will be described more precisely in the following with reference to an embodiment example.

DESCRIPTION OF THE PREFERRED EMBODIMENTS

Figure 1:
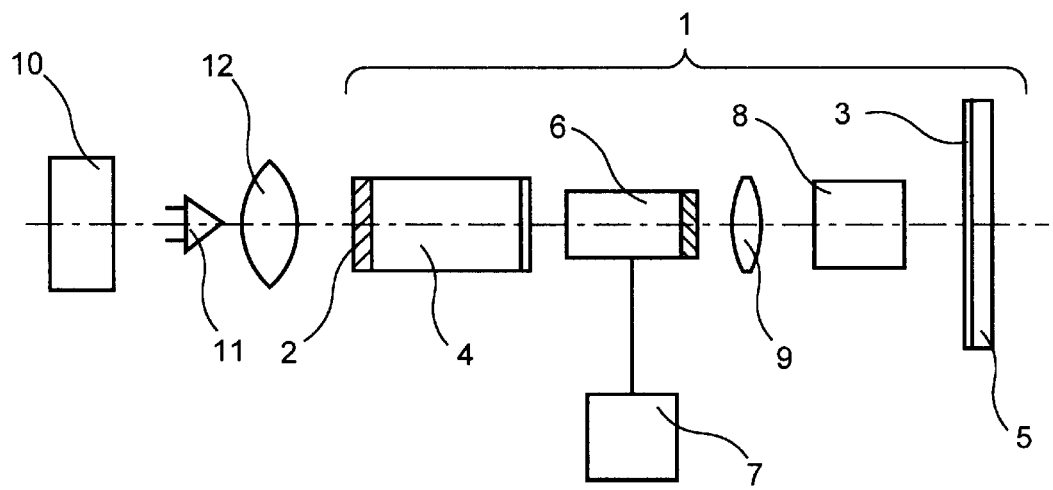
FIG. 1 shows schematically the construction of a Q-switched solid state laser according to the invention.

FIG. 1 shows schematically the construction of a solid state laser according to the invention. This Q-switched solid state laser comprises a resonator 1 which is formed by a reflecting surface 2 of a laser crystal 4 and a reflecting surface 3 of an output-coupling mirror 5 and in which the laser crystal LK 4 is arranged. This LK 4 is followed in the direction of light by an acousto-optic Q-switch 6 which is connected with an electronic unit 7 for generating suitable high-frequency waves. These high-frequency waves are used for controlling the Q-switch 6 in such a way that laser pulses with pulse lengths of one or more microseconds (µs) are generated by controlling the steepness of the edge of the modulation function (FIG. 2) of the high-frequency wave.

As is further shown in FIG. 1, a nonlinear crystal 8 comprising, for example, KTP, which doubles the frequency of the radiation emitted by the laser crystal 4 and on which the laser radiation is focused by optical means 9, e.g., collective optical elements, is located in the resonator 1 in order to achieve efficient frequency doubling. In this case, it is necessary to provide a low slope edge of the modulation signals for the acousto-optic Q-switch 6 so as to prevent possible radiation damage to the frequency-doubling crystal 8. The switching edge is the edge (FIG. 2) of the electrical pulses controlling the acousto-optic Q-switch 6 which are generated by the electronic unit 7.

For excitation of the laser crystal 4, a pump radiation source 10 is provided outside of the resonator 1, its pump radiation 11 being supplied to the laser crystal 4 for increasing the efficiency of excitation (of the pump) by optical focusing means 12, for example, collective lenses. A high pulse energy of the pump radiation causes a higher gain in the laser crystal 4 and accordingly also an increase in the intensity of laser radiation, wherein the inversion in the laser crystal 4 is quickly reduced because of the high gain, and short laser pulses are formed. In order to counter this, a low slope switching edge of the modulation signals is generated by the electronic unit 7 and is supplied to the Q-switch 6 for control.

Figure 2:
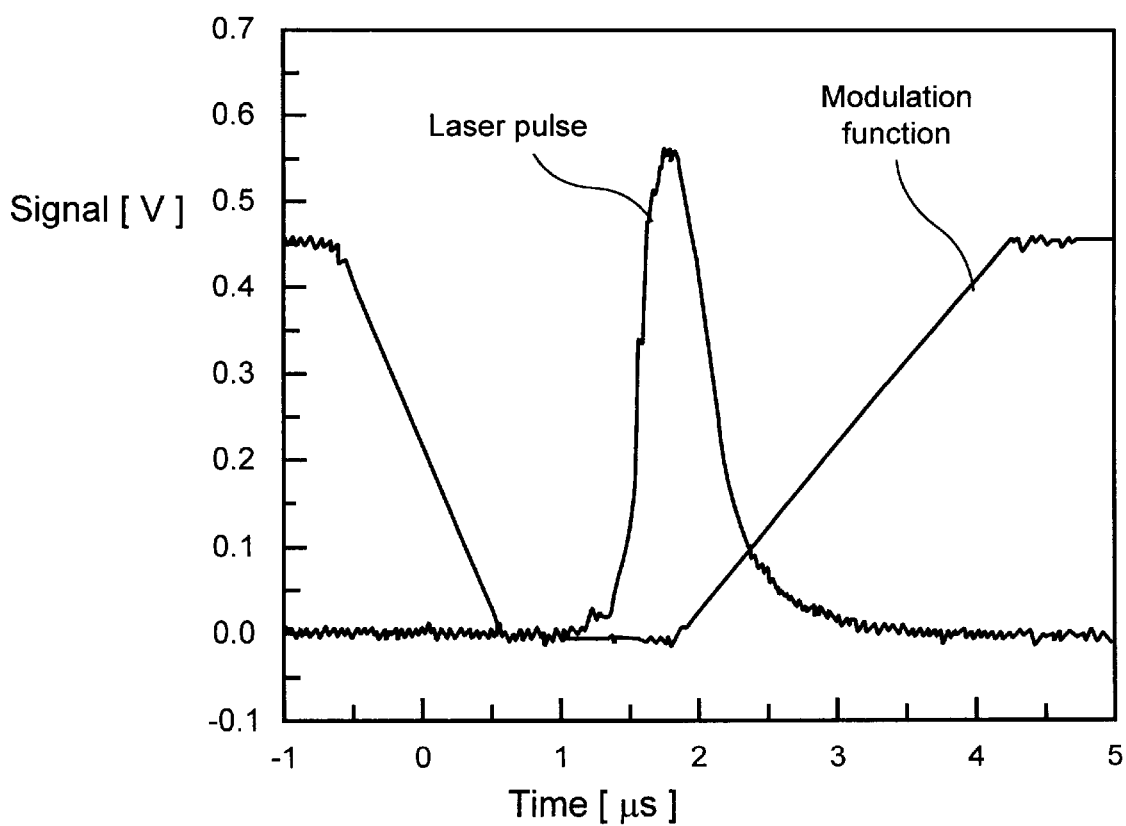
FIG. 2 shows a performance graph with modulation function and laser pulse.

The diagram in FIG. 2 shows a typical pulse leaving the laser, showing the characteristic asymmetric shape of the pulse with a steep leading edge on the left and a flat trailing edge on the right, as is also known from other Q-switched lasers. Also shown is the electric pulse controlling the Q-switch 6.

In regard to the adjustment of the applied pulse energy, there is a difficulty in a pulse laser with respect to application. To attenuate and reduce the possible radiation load, radiation attenuators can be provided; for example, absorption filters are used as attenuators of this kind. The use of an external absorber, e.g., an absorption filter, is usually eschewed because the radiation loading by the laser radiation can lead to thermal destruction of the absorber. On the other hand, dielectric layers on optical elements by which a portion of the laser radiation is reflected or polarizing beam splitters are suitable for attenuation.

However, this requires additional components and elements which must be controlled and monitored. In this connection, required movable, mechanical elements lead to system outages. A solution is offered by variation of pump output. The ensuing change in the pulse length of the laser radiation in the sense of a reduction in length is compensated in the solid state laser according to the invention by correspondingly adapting the steepness of the switching edge of the pulse of the electronic unit 7 controlling the Q-switch 6. A characteristic line of the relationship between pulse length, energy and steepness can be programmed into the unit 7 for controlling the laser.

The fluorescent light of the laser crystal 4 which is emitted shortly before the triggering of the laser pulse and is detected, for example, by a photoreceiver converting it for control purposes can be used as an indication, i.e. as a monitor (in the sense of a display), for the pumping energy stored in the laser crystal 4.

The frequency-doubled radiation emitted by the solid state laser is fed to an applicator, for example, an ophthalmologic device (not shown), wherein one or more quartz fibers with a diameter of the order of 50 µm are advantageously used for beam conduction. The coupling efficiency of the transmitted radiation output between fiber input and fiber output is about 80%.

While the foregoing descriptioni and drawings represent the present invention, it will be obvious to those skilled in the art that various changes may be made therein without departing from the true spirit of the present invention.

REFERENCE NUMBERS 1 resonator
2 surface
3 surface
4 laser crystal
5 output coupling mirror
6 Q-switch (acousto-optic q-switch)
7 electronic unit
8 frequency-doubling crystal (KTP)
9 optical element
10 pump radiation source
11 pump radiation
12 optical means

What is claimed is:

1. A Q-switched solid state laser comprising:

a laser crystal;

focusing elements;

a pump radiation source whose pump radiation is focused through said focusing elements in said laser crystal;

a resonator formed by reflecting surfaces in which at least one laser crystal, and an acousto-optic Q-switch are arranged;

said acousto-optic Q-switch being connected with an electronic unit generating a high-frequency wave which is modulated by a modulating unit generating a modulation function, whereby the modulation function comprises an unlocking edge signal; and said Q-switch being controlled by the high-frequency wave in such a way that laser pulses with pulse lengths of one or more microseconds are generated by controlling the steepness of the edge of the modulation function of the high-frequency wave.

2. The solid state laser according to claim 1, wherein a controllable radiation attenuator is provided outside of the resonator for adjusting the energy of the emitted laser pulses.

3. The solid state laser according to claim 1, wherein a setting of the energy of the laser pulses is realized by controlling the intensity of the pump radiation source and the pulse length of the laser radiation is adjusted by matching the edge steepness of the modulation of the high-frequency wave at the Q-switch.

4. The solid state laser according to claim 1, wherein fluorescent light which is emitted by the laser crystal shortly before lasing is utilized as a monitor for the pump energy stored in the laser crystal.

5. The solid state laser according to claim 1, wherein the pump radiation source is switched between continuous and pulsed operation in order to prevent thermal effects in the laser crystal.

6. The solid state laser according to claim 1, wherein a fiber which conducts light radiation is provided between the solid state laser and an applicator receiving the laser radiation.

7. A Q-switched solid state laser comprising:

a laser crystal;

focusing elements;

a pump radiation source whose pump radiation is focused through said focusing elements in said laser crystal;

a resonator formed by reflecting surfaces in which at least one laser crystal, and an acousto-optic Q-switch and a frequency-doubling KTP crystal are arranged;

said acousto-optic Q-switch being connected with an electronic unit generating a high-frequency wave which is modulated by a modulating unit generating a modulation function, whereby the modulation function comprises an unlocking edge signal; and said Q-switch being controlled by the high-frequency wave in such a way that laser pulses with pulse lengths of one or more microseconds are generated by controlling the steepness of the edge of the modulation function of the high-frequency wave.

8. The solid state laser according to claim 7, wherein means are provided for focusing the laser radiation in the frequency-doubling crystal in the resonator, wherein a low slope switching edge of the modulation function for the Q-switch thereby prevents radiation damage to the doubling crystal.

9. The solid state laser according to claim 7, wherein a controllable radiation attenuator is provided outside of the resonator for adjusting the energy of the emitted laser pulses.

10. The solid state laser according to claim 7, wherein a setting of the energy of the laser pulses is realized by controlling the intensity of the pump radiation source and the pulse length of the laser radiation is adjusted by matching the edge steepness of the modulation of the high-frequency wave at the Q-switch.

11. The solid state laser according to claim 7, wherein fluorescent light which is emitted by the laser crystal shortly before lasing is utilized as a monitor for the pump energy stored in the laser crystal.

12. The solid state laser according to claim 8, wherein the pump radiation source is switched between continuous and pulsed operation in order to prevent thermal effects in the laser crystal.

13. The solid state laser according to claim 7, wherein a fiber which conducts light radiation is provided between the solid state laser and an applicator receiving the laser radiation.

* * * * *